(12) United States Patent
Young

(10) Patent No.: US 6,822,192 B1
(45) Date of Patent: Nov. 23, 2004

(54) LASER ENGRAVING OF CERAMIC ARTICLES

(75) Inventor: Michael Joseph Young, Burleson, TX (US)

(73) Assignee: Acme Services Company, LLP, Fort Worth, TX (US)

(*) Notice: Subject to any disclaimer, the term of this patent is extended or adjusted under 35 U.S.C. 154(b) by 0 days.

(21) Appl. No.: 10/827,160

(22) Filed: Apr. 19, 2004

(51) Int. Cl.[7] .......................... B23K 26/00; B23K 26/36
(52) U.S. Cl. ............................................... 219/121.69
(58) Field of Search ..................... 219/121.6, 121.61, 219/121.62, 121.68, 121.69, 121.73, 121.83

(56) References Cited

U.S. PATENT DOCUMENTS

| | | |
|---|---|---|
| 3,747,117 A | 7/1973 | Fechter |
| 4,476,154 A | 10/1984 | Iesaka et al. |
| 4,476,310 A | 10/1984 | Honda et al. |
| 4,769,310 A | 9/1988 | Gugger et al. |
| 4,857,699 A * | 8/1989 | Duley et al. ........... 219/121.85 |
| 4,997,468 A | 3/1991 | Dimitrov et al. |
| 5,030,551 A | 7/1991 | Herren et al. |
| 5,198,637 A | 3/1993 | Noda et al. |
| 5,298,717 A | 3/1994 | DeRossett, Jr. |
| 5,397,686 A | 3/1995 | Dominick et al. |
| 5,416,298 A * | 5/1995 | Robert .................. 219/121.68 |
| 5,427,825 A | 6/1995 | Murnick |
| 5,473,138 A | 12/1995 | Singh et al. |
| 5,554,335 A | 9/1996 | Fields et al. |
| 5,673,532 A | 10/1997 | Jennings et al. |
| 6,064,034 A | 5/2000 | Rieck |
| 6,132,818 A * | 10/2000 | Tanaka et al. .............. 427/596 |
| 6,313,433 B1 * | 11/2001 | Sukman et al. ........ 219/121.67 |
| 6,331,691 B1 | 12/2001 | DePrisco et al. |
| 6,417,481 B2 | 7/2002 | Chen et al. |
| 6,586,702 B2 * | 7/2003 | Wiener-Avnear et al. ...................... 219/121.6 |
| 6,635,846 B1 | 10/2003 | Rieck |

FOREIGN PATENT DOCUMENTS

| | | |
|---|---|---|
| EP | 0369057 A1 | 5/1990 |
| JP | 07116869 A | 5/1995 |
| JP | 407269130 A | 10/1995 |
| WO | WO 95/35269 | 12/1995 |

* cited by examiner

Primary Examiner—Samuel M. Heinrich
(74) Attorney, Agent, or Firm—Gardere Wynne Sewell LLP

(57) ABSTRACT

A brick, and similar article, engraving process utilizes a $CO_2$ continuous beam laser guided over a beam path which outlines a graphic image on the article being engraved and repeats the beam path at incrementally spaced positions of the beam until the width of the graphic image is defined, thereby concentrating the heat of the laser engraving process in the vicinity of the graphic image during the process. The graphic image may be engraved in one or two passes of the beam over the surface of the article being engraved, such as common construction brick, wherein the engraving has minimal reflectivity and is of a uniform dark color providing an enhanced aesthetically pleasing engraved article.

25 Claims, 3 Drawing Sheets

LASER ENGRAVING OF CERAMIC ARTICLES

BACKGROUND OF THE INVENTION

Various efforts have been made to provide engraved ceramic articles, such as tile, concrete articles, plaster articles, refractory articles, and brick. Such articles are somewhat difficult to engrave in a manner which produces an aesthetically pleasing product. The compositions of such ceramic articles do not lend themselves to precise engraving methods. Efforts have been made to provide engraved brick for promotional, commemorative and other purposes utilizing laser beams and expensive, specialized laser beam generating equipment. Prior art efforts have produced results which are not always aesthetically suitable or economical.

Accordingly, there has been a continuing need to provide improved engraved ceramic articles, such as brick, which may be carried out with relatively inexpensive capital equipment so as to be cost effective while producing an aesthetically pleasing product. It is to these ends that the present invention has been developed.

SUMMARY OF THE INVENTION

The present invention provides an improved method of engraving ceramic articles, such as brick, articles of concrete and limestone and ceramic tile, whereby a precisely guided laser beam is used to carry out the engraving process. Commercially available equipment is used to generate a laser beam of modest power output and the characteristics of the beam, together with a method of steering the beam to engrave lettering and other graphic representations, produces a more aesthetically pleasing article in an efficient and economical manner.

In accordance with one aspect of the present invention, a method is provided for precision engraving conventional construction and paving brick, for example, wherein certain graphics, such as lettering which may include a name or word, may be engraved on the face of the brick. Other graphic representations may also be engraved using the laser engraving process of the present invention.

In accordance with another aspect of the present invention, an engraving process for brick and other ceramic articles is provided using commercially available laser equipment having a focusing lens which reduces the laser beam diameter to a predetermined dimension upon delivery of the beam from the laser itself. A suitable beam intensity is derived from such an arrangement of beam treatment which has been discovered to be particularly advantageous for engraving brick and the like when used in conjunction with other parameters of the process of the invention.

In accordance with a further aspect of the present invention, a brick engraving process is provided wherein a laser beam is guided in such a way as to complete the engraving of a graphic character or characters, such as one or more English letters which are engraved into the brick, and wherein each letter is engraved in at least one pass over the character before the laser beam is steered to begin engraving the next letter or graphic character. In this way, heat generated by the laser does not dissipate away from the specific area of the brick or other ceramic article on which the engraving process is being carried out, thus resulting in a more effective engraving process.

The present invention also provides an engraving process wherein a suitable depth of engraving may be accomplished on articles, such as conventional brick, by making one and, preferably, no more than two passes of the laser beam over the article being engraved. For the particular power output of the laser and the beam width imposed on the article, a desired depth of engraving and surface characteristics of engraving are provided which yield a desirable finish or visual impression of the engraving.

Those skilled in the art will further appreciate the above-mentioned advantages and superior features of the invention upon reading the detailed description which follows in conjunction with the drawings.

BRIEF DESCRIPTION OF THE DRAWING FIGURES

DETAILED DESCRIPTION OF A PREFERRED EMBODIMENT

Figure 1:
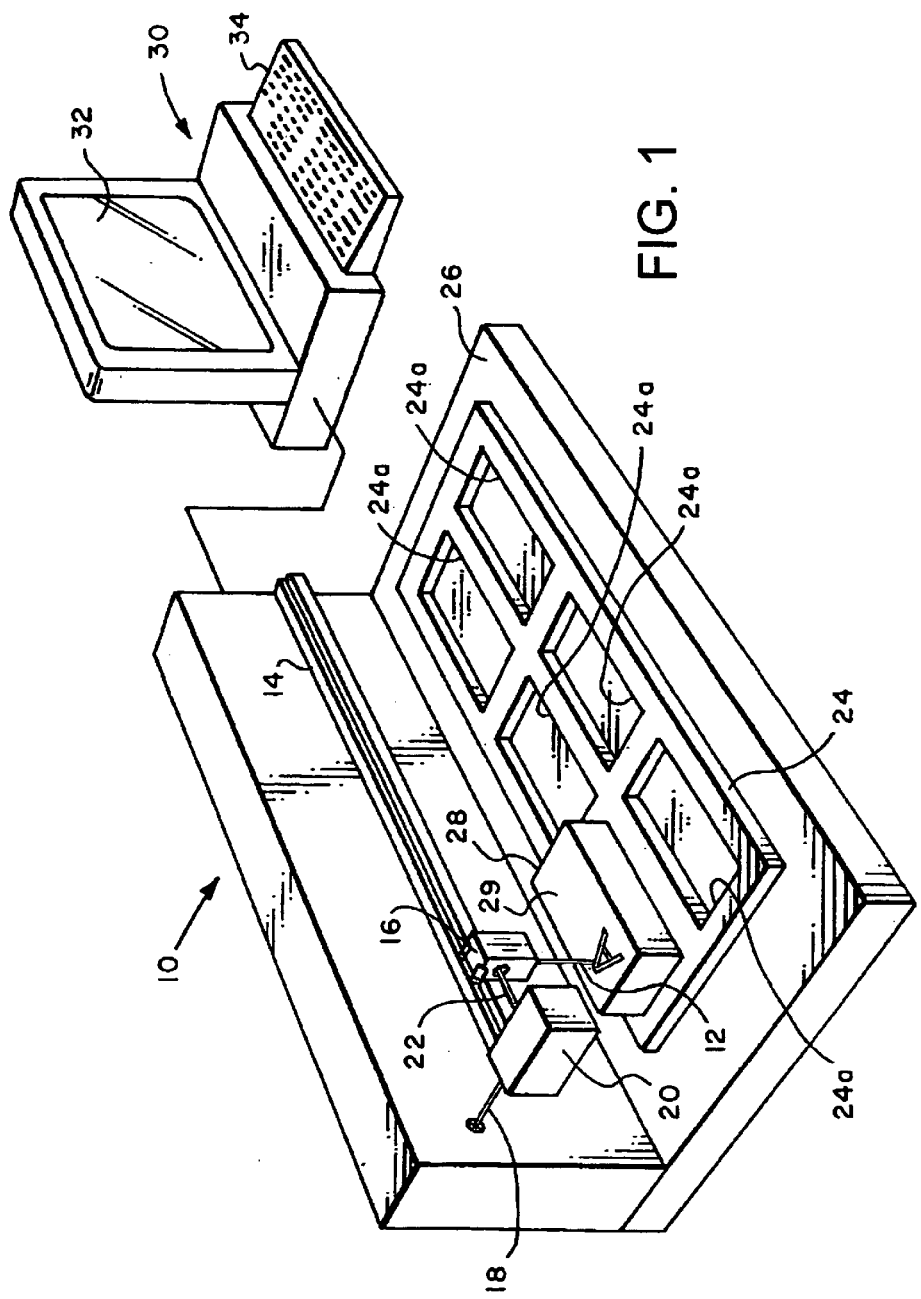
FIG. 1 is a perspective view of a laser engraving system for carrying out an improved laser engraving process in accordance with the invention.

In the description which follows, like elements are marked throughout the specification and drawings with the same reference numerals, respectively. The drawing figures may not be to scale and certain features may be shown in schematic or somewhat generalized form in the interest of clarity and conciseness.

The present invention contemplates an improved method of engraving ceramic articles selected from a group broadly defined as brick, tile, cement, plaster, and certain natural stone articles. Such articles are widely used in construction as exterior facing of residential and commercial buildings, as structural elements, as pavement articles, and as interior structural articles such as flooring, wall surfaces, fireplaces, etc. Conventional brick used in the construction of commercial and residential buildings and as roadway or walkway paving surfaces is ubiquitous. Mixtures of aluminum silicate, montmorillonite, kaolite, illite or shale, together with other substances, such as sand, bottom ash and recycled firebrick material, are used in the composition of brick. Locally available materials in proximity to a brick manufacturing facility often dictate the chemical composition of brick and tile articles. Conventional brick is typically at least eighty percent aluminum silicate. This naturally occurring mineral can be formed of various proportions of montmorillonite, kaolite, and illite, which are characteristic of the various types of clay or shale deposits mined for brick manufacture. Large scale brick manufacturing operations, such as the operations of the assignee of the present invention, may manufacture brick having hundreds of specific compositions. Accordingly, the provision of a brick engraving process which is operable to provide a suitable engraving for aesthetic purposes for bricks having a wide variety of specific chemical compositions is desirable. Reduction in the time required to accomplish a particular engraving is clearly desirable. Simplification of the equipment and the process, such as by eliminating the use of specialized gases, and the provision of an engraving which is less reflective or glassy in appearance are also desirable. To this end, the present invention contemplates a method of engraving brick, tile and similar articles utilizing commercially available laser equipment.

Referring to FIG. 1, one preferred apparatus for use in the method of the invention is a commercially available laser engraving apparatus, generally designated by the numeral 10. The laser engraving apparatus 10 may be of a type available from Universal Laser Systems, Inc., Scottsdale, Arizona, as their Model X2-660 Laser Engraving System. The laser engraving system 10 may be operated at so-called room temperature and ambient atmospheric pressure conditions and, preferably, uses two sixty watt $CO_2$ laser tubes generating one hundred twenty watts power total. The laser engraving system 10 utilizes a so-called flying mirror arrangement or mechanism to manipulate a continuous laser output beam 12 whereby an elongated rail 14 supports a flying mirror and lens device 16 for movement along the so-called X axis, and the device 16 is movable along a Y axis by suitable apparatus, not shown in FIGS. 1 or 2. A laser beam is generated by the apparatus 10 and projected along a path 18 to a mirror apparatus 20 whereupon the beam is re-directed along a path 22 to the device 16 and then re-directed downwardly to form the beam 12. Typically, the beam projected along paths 18 and 22 is about 0.125 inches diameter and is projected through a lens, not shown, mounted within the device 16 having a focal length of about 4.0 inches, which beam is reduced to a diameter, preferably, not less than about 0.013 inches for the beam 12. This arrangement does not require a collimator and provides a beam intensity of about $1.333 \times 10^5$ watts/cm$^2$.

Figure 2:
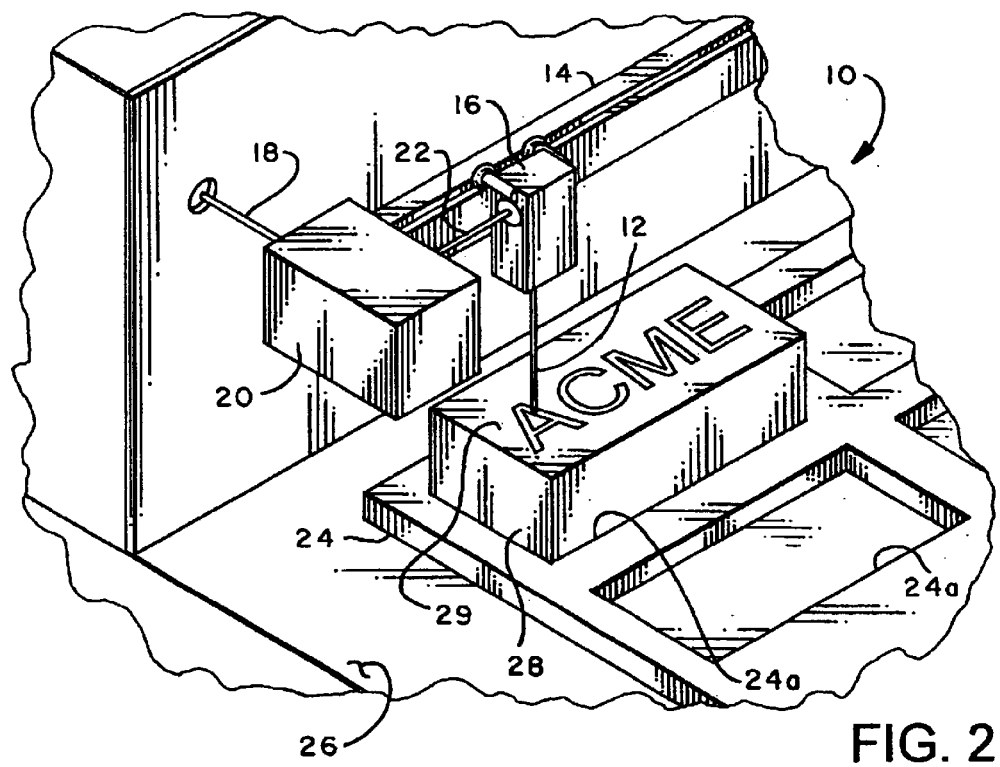
FIG. 2 is a detail perspective view of a portion of the system on a larger scale.

As further shown in FIGS. 1 and 2, the apparatus 10 is of sufficient capacity to permit the use of a workpiece locating template 24 adapted to be releasably secured on a work surface 26 and having plural recesses 24a formed therein for receiving and locating one or more conventional construction bricks 28, of a type previously discussed herein. Accordingly, the apparatus 10, having its own processor for controlling movement of the concentrated beam 12, may operate to engrave plural bricks 28, one shown in a continuous production operation before requiring that a new set of one or more bricks be inserted in the receptacles 24a and a new cycle of engraving carried out. Only one brick 28 is shown located in the template 24 in the illustration of FIGS. 1 and 2. However, those skilled in the art will recognize that each of the receptacles 24a may have a brick placed therein and the engraving process carried out on each brick before requiring that the bricks be removed and replaced by a new set of bricks or similar articles to which engraving is to be applied.

The processor associated with the apparatus 10 may receive instructions from a second commercially available processor 30 utilizing a commercially available computer program which may be used to align the text of the engraving, such as the word "ACME" as shown in FIGS. 1 and 2, as well as any other text or graphics for proper placement on surface 29 of the brick 28. For example, the text may be aligned as to the left side, right side and center of a particular brick with selected spacing between each line of text, and the text may be outlined in a particularly chosen color, and wherein the color denotes a power setting of the laser of the apparatus 10. This process is carried out on the processor 30 which includes a video display or monitor 32 and a keyboard 34. A preferred computer program for generating graphics or text to be engraved on the brick 28, for example, is commercially available under the trademark "CorelDRAW" available from Corel, Inc., Dallas, Tex.

Figure 3:
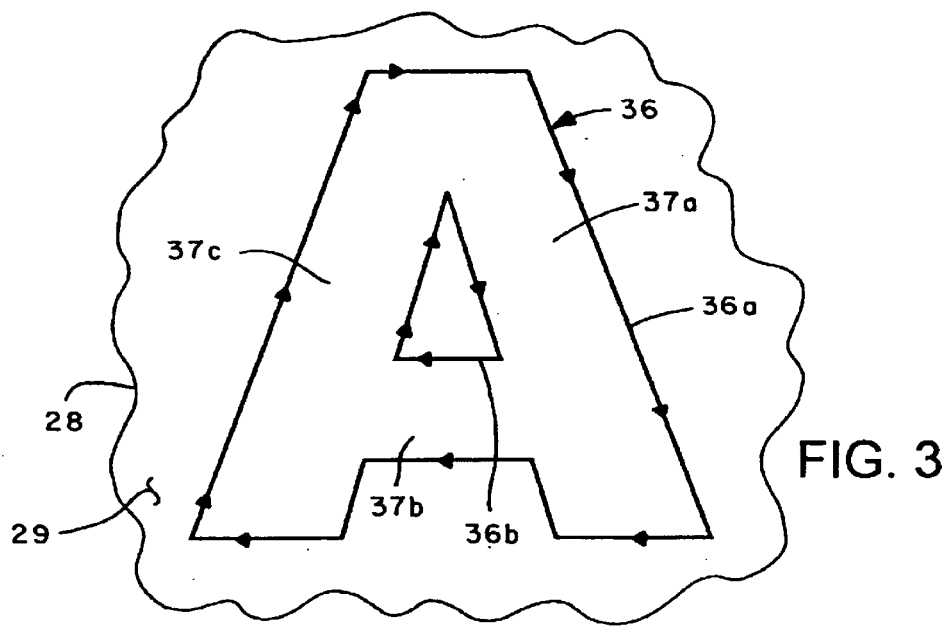
FIGS. 3 through 5 are somewhat schematic diagrams showing the path or pattern of the laser beam in accordance with the method of the present invention to engrave a particular graphic character.
Figure 4:
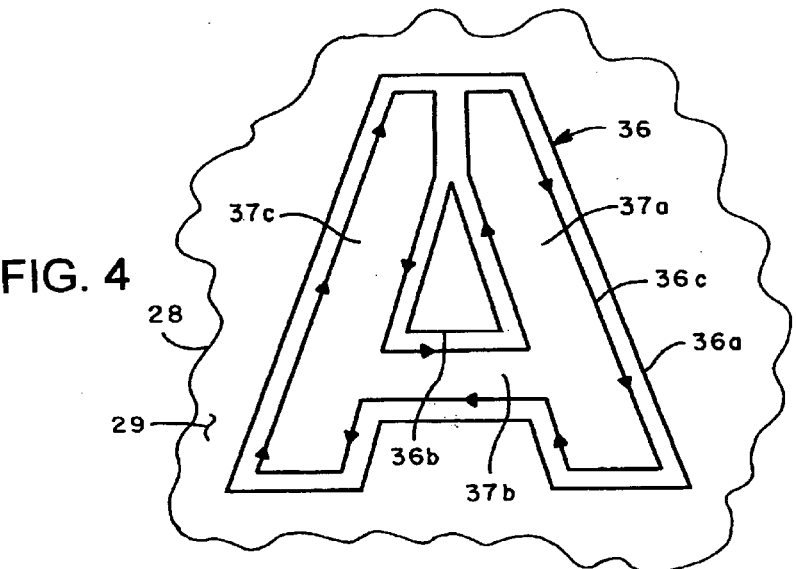
Figure 5:
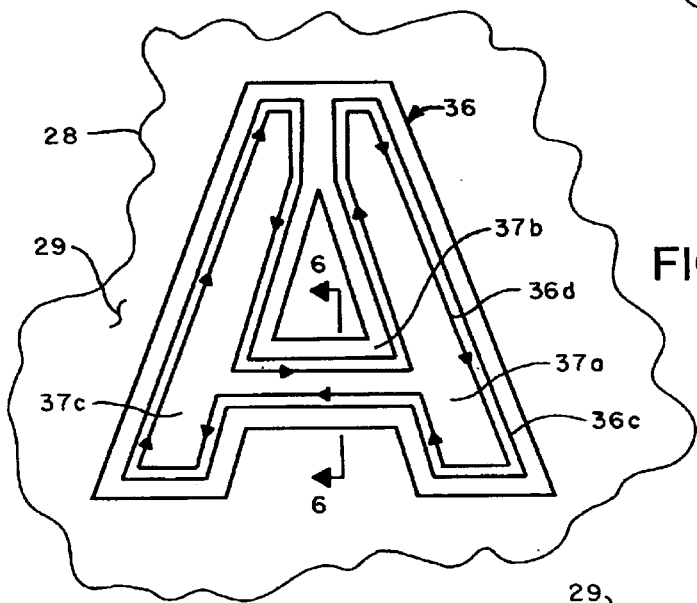

An important aspect of the invention with respect to engraving graphics to be applied on a ceramic article, such as the brick 28, is to require that each image or character, such as the letters "A", "C", "M" and "E" or any other graphic representation, is engraved using a so-called vector mode of operation. Referring to FIG. 3, for example, an image of the letter A, indicated by reference numeral 36, is engraved on brick 28 by causing the laser beam 12 to follow an overall outline of the letter, as indicated by path 36a, and then completing an outline of the image by following a path 36b, for example. The specific paths 36a and 36b will be modified, depending on the shape of the image to be engraved. After defining an image outline, the beam 12 is traversed repeatedly along an outline of the character 36 at incrementally changed and preferably reduced path dimensions whereby the laser beam 12 may follow a continuous path 36c, for example, as shown in FIG. 4. This process may be repeated at incrementally reduced dimensions wherein a continuous, in many instances, unbroken path may be traced by the beam 12. As shown by way of example in FIG. 5, a third incrementally spaced and reduced length, continuous beam path 36d is followed by the laser beam 12, also tracing an outline generally parallel to path 36c to carry out the engraving process of the graphic character 36 comprising the letter "A", for example. The beam 12 is incrementally moved across the width of each leg 37a, 37b and 37c of the letter character "A" shown by example in FIGS. 3 through 5 and is indexed laterally a distance, preferably, slightly less than the beam width for each pass. Continuous paths, similar to beam paths 36c and 36d are repeated until the width of the graphic image is defined by moving incrementally from the side edges of the image toward the center of each leg, such as legs 37a, 37b and 37c, for example. This process may also be defined as a vector mode of operation of the apparatus 10.

This method of operation is particularly important for engraving ceramic articles, such as bricks, tiles, concrete pavement articles, limestone articles and the like, and generally of the type described herein. By carrying out the steps of repeated outlining of the shape of the graphic image or character, such as the letter "A" illustrated in the drawing figures, heat generated by the laser beam 12 remains concentrated in the area of the engraving throughout the process. In other words, as the laser beam makes "cuts" into the surface 29 while being steered along paths 36a, 36b, 36c and 36d, the heat generated by each "cut" is not substantially dissipated away from the area of the cut prior to the next cut and this facilitates improved engraving quality when the second, third, fourth, and so on, cuts are made by the laser beam as it follows paths 36c, 36d, and so on.

By comparison, if a so-called raster type engraving process is carried out, only a small portion of letter "A" would be cut, followed by cutting a small portion of the letter "C" (in the example of FIGS. 1 and 2), followed by cutting a small portion of the letter "M" and finally a small portion of letter "E". The laser beam would then be redirected back to the letter "A" and a second small portion cut followed again by cutting small portions of letters "C", "M" and "E". Since the laser beam has left the vicinity of the letter "A" for a substantial period of time while it cuts small portions of letters "C", "M" and "E", heat is dissipated away from the location of the engraving of letter "A" and a lower quality engraving is obtained.

The number of times that the laser beam is required to be traced over a particular path to accomplish engraving of the graphic character 36, the letter "A", for example, depends on the width of the graphic character. For example, graphic engraving of bricks may be carried out by providing a width of legs 37a, 37b and 37c of character 36, for example, of up to about 0.125 inches for a graphic representation, and the character (the letter "A") having a height of about 0.50 inches to 0.75 inches. Accordingly, if the width of beam 12 is 0.013 inches and a slight overlap of the beam "footprint" is required, the lateral spacing between the paths 36a, 36c and 36d would be, preferably, about 0.010 inches and thus requiring about twelve or thirteen passes of the laser beam 12 along the legs 37a, 37b and 37c which define the letter "A". In other words, six complete circuits of the laser beam 12 along continuous paths, like paths 36c and 36d, would be required, for example, in order to cover the width of each leg 37a, 37b and 37c.

Moreover, providing the beam 12 with the intensity and dimensions of beam described above, with two separate and complete passes of the beam along its working path, a total depth of cut of about 0.80 inches from the surface 29 may be obtained on conventional bricks, concrete pavers and ceramic tiles, for example. A major part of the overall depth of the cut is normally obtained on the first cutting operation or "pass" over the entire graphic image 36 comprising the letter "A" shown in FIGS. 3, 4 and 5, and then this process is repeated on a so-called second pass to obtain the total depth of cut desired. Thus, the beam 12 would make twelve to thirteen incrementally spaced runs over the brick 28, or six closed circuit traces, to provide the character 36 in a first pass and then repeat that process to obtain the full desired depth of the image in a second pass.

Figure 6:
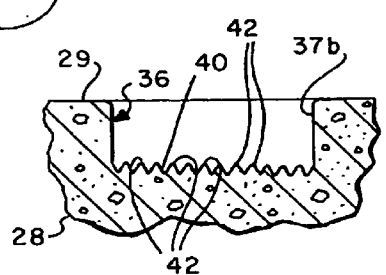
FIG. 6 is a detail cross-section view taken from the line 6—6 of FIG. 5 showing the surface characteristics of the engraving carried out by the method of the invention.

Another advantage of the process of the present invention is illustrated in FIG. 6 showing the overall depth of cut to produce the engraved graphic character 36 comprising the letter "A", for example. The bottom surface 40 of the leg 37b, as shown in FIG. 6, is somewhat roughened by having several slightly spaced apart peaks 42, for example, typically, in total, being the same number as the number of incrementally spaced runs or cuts of the laser beam 12 to form the leg 37b of the graphic character 36. This roughened surface 40 provides a dark colored, somewhat matte-like finish to the engraving, reduces the glassy reflective surface of prior art engraving processes and has been deemed to be aesthetically pleasing. Again, by carrying out the engraving process using the above-described mode of tracing of the path of the laser beam 12 and retaining heat concentrated in the area of the graphic image to be engraved, a laser beam of moderate power may be utilized while material is efficiently removed from an article, such as the brick 28, to provide the engraving, but without causing substantial vitrification of the article surface and the resulting glassy appearance.

The above described process of engraving a brick or similar article, such as the brick 28, is carried out by the processor of the apparatus 10 upon the sending of suitable instructions thereto from the processor 30. These steps are similar in nature to those wherein a document generated on the processor 30 would be sent to a computer printer. This avoids the requirements for a so-called CNC (computer numerically controlled) system or an MMI (man to machine interface) type of system.

Utilizing the CorelDRAW computer program and the apparatus 10 of the type described above, during the graphic image generating process, the power output and speed of movement of the laser beam across the surface 29 may be selected, as previously mentioned, by filling in a certain color on the graphic image generated on the monitor 32, for example. Selecting a particular color provides a corresponding signal to the apparatus 10 which controls the power output and speed of movement of the beam 12. For engraving bricks of the type described herein, it has been determined that a beam speed in the range of about 120 mm/sec to as much as 1000 mm/sec at one hundred percent power output of the laser is desirable to produce a quality cut or engraving. In particular, a beam speed of about 250 mm/sec may be more desirable. Bricks, such as the brick 28 or similar articles, may be engraved at conventional room temperature with a $CO_2$ laser of the type associated with the apparatus 10, using one and preferably two passes of the beam over the entire surface of the engraved image, such as the engraving 36 representing the letter "A", as shown and described by way of example.

As described above, the beam 12 may make one complete pass, that is, plural closed circuit traces, including traces 36c, 36d, to form a certain depth of cut of an engraved image, such as the image 36, then repeat the same process on the same image and then proceed to the next image such as the letter "C" for the brick 28, and so on. Alternatively, the beam 12 may be controlled to make one pass on each image on each brick and then repeat the same process on a second pass on each image on each brick to complete the full depth of "cut" of the engraved image. The speed of the beam 12 may be varied with respect to the first and second passes. Certain brick materials may be more efficiently engraved with a relatively slow beam speed on the first pass and a faster beam speed on the so-called second pass. As mentioned above, beam speed could be as low as 120 mm/sec on the first pass and then as high as 1000 mm/sec on the second pass. The speed of the second pass may be greater if each image, such as the image 36, is cut on successive passes rather than engraving each image partially on a first pass and then starting over with a first image to complete the depth of cut on each successive image. For example, if the image 36 is cut on the first pass at a relatively low speed, sufficient heat may be retained to allow a much higher beam speed on the second pass. Alternatively, each brick may be engraved to a partial depth of cut on the first pass and then each brick may be completed by cutting each engraving on the second pass at the same beam speed as the first pass. For example, if a beam speed of between 300 mm/sec and 400 mm/sec is run on the first pass, then approximately the same beam speed may be used on the second pass to obtain the full depth of cut. The composition of various bricks, is indicated to dictate the specifications on beam speed for each pass and whether or not an engraving such as the image 36 is completed before the beam is moved to another image on the same brick 28 or to another brick.

An improved method of engraving articles, such as brick, ceramic tile, concrete articles, limestone articles and similar vitrescent or vitrifiable articles, has been described in detail herein such as to enable one skilled in the art to practice the invention. Although a preferred embodiment of a method of laser engraving of such articles has been described, those skilled in the art will also recognize that various substitutions and modifications may be made without departing from the scope and spirit of the appended claims.

What is claimed is:

1. A method for engraving an image on a surface of an article selected from a group consisting of brick, ceramic tile, concrete pavers and natural stone articles, comprising the steps of:

providing a laser engraving apparatus comprising a steerable laser beam operable to be substantially continuously moved over a predetermined beam path on said surface to provide an engraved image having a predetermined width;

causing said laser beam to be traversed over said surface along a predetermined first beam path; and repeatedly traversing said laser beam over a path substantially parallel to said first beam path and incrementally spaced therefrom a sufficient number of times to define the engraved image.

2. The method set forth in claim 1 including the step of:

repeating the step of causing said laser beam to repeatedly traverse over incrementally spaced beam paths to provide a predetermined depth of said graphic image.

3. The method set forth in claim 1 including the step of:

providing said laser engraving apparatus with a $CO_2$ laser having a predetermined beam power output.

4. The method set forth in claim 3 including the step of:

reducing said laser beam to a predetermined beam width for increasing the intensity of said laser beam sufficiently to engrave an image on said article.

5. The method set forth in claim 1 including the step of:

engraving additional graphic images on said article by causing said laser beam to trace multiple paths over the entirety of each of said additional graphic images seriatim so as to concentrate heat in said article in the vicinity of said additional graphic images, respectively.

6. The method set forth in claim 1 including the step of: engraving a graphic image on said article at room temperature and at atmospheric conditions.

7. The method set forth in claim 1 including the step of: engraving said image on said article by vitrifying the material composition of said article at said image.

8. The method set forth in claim 1 including the step of: reducing the beam width of said laser beam to not less than about 0.013 inches diameter.

9. The method set forth in claim 1 including: providing the intensity of said laser beam on said surface to be about $1.333 \times 10^5$ watts/cm$^2$.

10. The method set forth in claim 9 including the step of: traversing said laser beam over said surface at a rate of about 120 mm/sec to 1000 mm/sec.

11. A method for engraving an image on a surface of an article selected from a group consisting of brick, ceramic tile, concrete pavers and natural stone articles, comprising the steps of:

providing a laser engraving apparatus comprising a steerable continuous laser beam operable to be continuously moved over a predetermined beam path on said surface to provide an engraved image having a predetermined width;

causing said laser beam to be traversed over said surface along a predetermined first beam path which includes an outline of a graphic image to be engraved on said article;

repeatedly traversing said laser beam over continuous paths substantially parallel to said first beam path, incrementally spaced therefrom and moving toward a centerline of the width of said image a sufficient number of times to define said image; and repeating the step of traversing said laser beam to define said image by said repeated traversals to provide a predetermined depth of cut of said graphic image.

12. The method set forth in claim 11 including the step of: providing said laser engraving apparatus with a CO$_2$ laser having a predetermined beam power output.

13. The method set forth in claim 12 including the step of: reducing said laser beam to a predetermined beam width for increasing the intensity of said laser beam sufficiently to engrave an image in said article.

14. The method set forth in claim 11 including the step of: engraving additional graphic images on said article by causing said laser beam to trace a path over the entirety of each of said additional graphic images seriatim so as to concentrate heat in said article in the vicinity of said additional graphic images, respectively.

15. The method set forth in claim 11 including: providing the intensity of said laser beam on said surface to be about $1.333 \times 10^5$ watts/cm$^2$.

16. A method for engraving a surface of an article selected from a group consisting of brick, ceramic tile, concrete pavers and natural stone articles, comprising the steps of:

(a) providing an apparatus comprising a laser generating a steerable laser beam reduced to a predetermined beam width and operable to be continuously moved over a predetermined beam path on said surface to provide a first engraved image having a predetermined width;

(b) causing said laser beam to be traversed over said surface along a predetermined first beam path which includes an outline of said first image to be engraved on said article;

(c) repeatedly traversing said laser beam over a path substantially parallel to said first beam path, incrementally spaced therefrom and of incrementally reduced path length, a sufficient number of times to define said first image; and (d) repeating steps (b) and (c) to engrave a second image on said article.

17. The method set forth in claim 16 including the step of: engraving additional graphic images on additional articles by causing said laser beam to trace a path over the entirety of each of said additional graphic images seriatim so as to concentrate heat in said additional articles in the vicinity of said additional graphic images, respectively.

18. The method set forth in claim 16 including the step of: reducing the beam width of said laser beam to not less than about 0.013 inches diameter.

19. The method set forth in claim 18 including: providing the intensity of said laser beam on said surface to be about $1.333 \times 10^5$ watts/cm$^2$.

20. The method set forth in claim 19 including the step of: traversing said laser beam over said surface at a rate of about 120 mm/sec to 1000 mm/sec.

21. A method for engraving a surface of an article selected from a group consisting of brick, ceramic tile, concrete pavers and natural stone articles, comprising the steps of:

(a) providing an apparatus comprising a laser generating a steerable laser beam having a predetermined beam width and operable to be continuously moved over a predetermined beam path on said surface to provide a first engraved image having a predetermined width;

(b) causing said laser beam to be traversed over said surface along a predetermined first beam path which includes an outline of said first image to be engraved on said article;

(c) repeatedly traversing said laser beam over a path substantially parallel to said first beam path, incrementally spaced therefrom and of incrementally reduced path length, a sufficient number of times to define said first image;

(d) repeating steps (b) and (c) on another article to provide said image on said another article; and (e) repeating steps (b) and (c) on the first mentioned article and then again on said another article to provide a predetermined depth of cut of images on said articles, respectively.

22. The method set forth in claim 21 including the steps of:

engraving additional graphic images on additional articles, respectively, by causing said laser beam to trace a path over the entirety of each of said additional graphic images seriatim so as to concentrate heat in said additional articles in the vicinity of said additional graphic images, respectively.

23. The method set forth in claim 21 including the step of: reducing the beam width of said laser beam to not less than about 0.013 inches diameter.

24. The method set forth in claim 23 including: providing the intensity of said laser beam on said surface to be about $1.333 \times 10^5$ watts/cm$^2$.

25. The method set forth in claim 24 including the step of: traversing said laser beam at a rate of about 120 mm/sec to 1000 mm/sec.

* * * * *